US012654897B2

(12) United States Patent
Gabusi

(10) Patent No.: US 12,654,897 B2
(45) Date of Patent: Jun. 16, 2026

(54) APPARATUS AND METHOD FOR THE AUTOMATED MANAGEMENT OF A PROCESSING CHAMBER WITH A CONTROLLED ATMOSPHERE

(71) Applicant: I.M.A. Industria Macchine Automatiche S.p.A., Ozzano dell'Emilia (IT)

(72) Inventor: Gabriele Gabusi, Ozzano dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 1256 days.

(21) Appl. No.: 17/606,315

(22) PCT Filed: Apr. 29, 2020

(86) PCT No.: PCT/IT2020/050105
§ 371 (c)(1),
(2) Date: Oct. 25, 2021

(87) PCT Pub. No.: WO2020/225838
PCT Pub. Date: Nov. 12, 2020

(65) Prior Publication Data
US 2022/0204203 A1      Jun. 30, 2022

(30) Foreign Application Priority Data

May 6, 2019      (IT) ........................ 102019000006552

(51) Int. Cl.
*B65B 59/04*      (2006.01)
*B25J 9/16*      (2006.01)
(Continued)

(52) U.S. Cl.
CPC ............. *B65B 59/04* (2013.01); *B25J 9/1687* (2013.01); *B25J 21/005* (2013.01); *B65B 3/003* (2013.01);
(Continued)

(58) Field of Classification Search
CPC ......... B65B 59/04; B65B 3/003; B65B 35/16; B65B 57/00; B25J 9/1687; B25J 21/005; B25J 15/0028; B25J 9/1697; B25J 19/023
See application file for complete search history.

(56) References Cited

U.S. PATENT DOCUMENTS

| 4,853,771 A | 8/1989 | Witriol et al. |
| 5,783,156 A | 7/1998 | Renzi et al. |

(Continued)

FOREIGN PATENT DOCUMENTS

| DE | 102015102143 A1 * | 8/2016 |

OTHER PUBLICATIONS

Int'l Search Report and Written Opinion issued May 19, 2020 in Int'l Application No. PCT/IT2020/050105.

*Primary Examiner* — Michael Collins
(74) *Attorney, Agent, or Firm* — Panitch Schwarze Belisario & Nadel LLP

(57) ABSTRACT

An apparatus and a method for the automated management of the assembly of a machine for processing and/or packaging pharmaceutical products inside an insulated processing chamber, with controlled atmosphere and delimited by walls, at least one of which is provided with at least one access aperture which can be selectively closed by a primary closing unit. The apparatus includes a transport container able to contain one or more assemblable elements which are introduced into or removed from the processing chamber, and which is associated with the access aperture from the outside of the chamber provided with a secondary closing
(Continued)

unit able to cooperate with the primary closing unit so that they can be opened to put the inside of the transport container in communication with the inside of the chamber. The apparatus also includes a handling device and a work tool configured to alternately grip or release the assemblable elements.

18 Claims, 4 Drawing Sheets

(51) Int. Cl.

| | |
|---|---|
| *B25J 15/00* | (2006.01) |
| *B25J 21/00* | (2006.01) |
| *B65B 3/00* | (2006.01) |
| *B65B 35/16* | (2006.01) |
| *B65B 57/00* | (2006.01) |

(52) U.S. Cl.
CPC .............. *B65B 35/16* (2013.01); *B65B 57/00* (2013.01); *B25J 15/0028* (2013.01)

(56) References Cited

U.S. PATENT DOCUMENTS

| | | | | |
|---|---|---|---|---|
| 6,672,820 | B1 * | 1/2004 | Hanson | H10P 72/53 |
| | | | | 901/8 |
| 6,799,932 | B2 * | 10/2004 | Davis | H10P 72/3311 |
| | | | | 414/217 |
| 2004/0185521 | A1 | 9/2004 | Yoshida et al. | |
| 2009/0223592 | A1 * | 9/2009 | Procyshyn | B25J 21/00 |
| | | | | 141/2 |
| 2011/0067781 | A1 * | 3/2011 | Osborne | B65B 55/00 |
| | | | | 141/37 |
| 2024/0190651 | A1 * | 6/2024 | Bott | C12M 41/48 |

* cited by examiner

APPARATUS AND METHOD FOR THE AUTOMATED MANAGEMENT OF A PROCESSING CHAMBER WITH A CONTROLLED ATMOSPHERE

CROSS-REFERENCE TO RELATED APPLICATIONS

This application is a Section 371 of International Application No. PCT/IT2020/050105, filed Apr. 29, 2020, which was published in the English language on Nov. 12, 2020, under International Publication No. WO 2020/225838 A1, which claims priority under 35 U.S.C. § 119(b) to Italian Application No. 102019000006552, filed May 6, 2019, the disclosures of each of which are incorporated herein by reference.

FIELD OF THE INVENTION

The invention concerns an apparatus and method for the automated management of a processing chamber with a controlled atmosphere, generally called an "isolator" or "clean room", in particular in the context of a machine for packaging and/or processing pharmaceutical products that operates in a protected environment and in controlled and defined atmospheric conditions. The apparatus and method according to the present invention are configured to automatically manage the assembly of the machine as above, in particular, to automatically insert and remove, into/from the processing chamber, elements or components intended to be installed on fixed structures placed in the chamber.

BACKGROUND OF THE INVENTION

In the pharmaceutical sector, the operations of processing and packaging pharmaceutical products such as, for example, powders, tablets, pills, or suchlike, are carried out inside a protected chamber separated from the external environment, generally called "isolator", which is kept in sterile conditions and in a controlled atmosphere.

Processing and/or packaging devices and equipment are disposed inside the protected chamber, connected with the outside by means of special entrances and exits provided with transfer ports that allow a protected transfer of material inside and outside the protected chamber, preventing a direct connection between the internal and external environment of the chamber itself. Such transfer ports, which are subject to certifications attesting their compliance with current regulations, are generally known as "Alpha-Beta" ports or also as "RTPs", an acronym for Rapid Transfer Ports.

The protected chamber is also normally equipped with handling devices that allow an operator to interact with the products and/or the equipment located inside it, such as gloves by means of which an operator can operate inside the protected chamber. The gloves are generally attached with a hermetic seal to a special hole provided on a wall of the protected chamber, from which they project toward the inside of the chamber.

In order to guarantee that the required sterility requirements are always met, the atmosphere of the protected chamber has to always be kept separate from that of the external environment and it is also provided to periodically carry out treatments, inside the protected chamber, with suitable chemical substances that have a bactericidal and fungicidal action. For example, one of the most popular treatments is the treatment cycle called VHP (Vaporized Hydrogen Peroxide), in which substances based on vaporized hydrogen peroxide are introduced into the protected chamber to carry out the sterilization cycles thereof During these cycles, which are regulated by stringent regulations in order to guarantee the cleanliness and hygiene of the processing and packaging process of pharmaceutical products, the substances introduced into the chamber are deposited on the walls of the chamber itself and on every object, component or structure contained inside it in order to completely sterilize the protected chamber.

One disadvantage of the state of the art is that traces of the substances used in the sterilization cycles have been found in the pharmaceutical products treated and packaged in the protected chamber. This occurs because the pharmaceutical products come into contact with different elements disposed inside the protected chamber, such as the guides along which they advance, which have undergone the sterilization cycle and on which a certain quantity of the sterilizing substances used in such cycles has deposited. It is evident that this disadvantage is particularly undesirable and there is a need to prevent the user of the pharmaceutical product from also ingesting traces of sterilizing substances used in the sterilization cycles.

Another disadvantage of the state of the art is that, since the sterilizing substances used are often very chemically aggressive, over time they can corrode some elements or components placed inside the protected chamber. It is clear that this disadvantage is also particularly undesirable and there is a need to prevent the sterilizing substances used in the sterilization cycles from damaging elements or components positioned in the protected chamber, shortening their useful life, which makes it necessary to replace them prematurely, with a consequent increase in maintenance costs and times.

In order to overcome these disadvantages, systems to manage the protected chambers have been perfected, in which it is provided to dismantle all the components or elements intended to come into contact with the pharmaceutical products being processed before carrying out a sterilization cycle, so that they can then be reassembled in the respective positions at the end of the sterilization cycle.

One example of such systems is described in German patent application no. DE-A1-102015102143, the system of which comprises a transport container for introducing/removing components into/from the protected chamber without breaching or interrupting its protected atmosphere. The transport container is disposed outside the protected chamber and is intended to be temporarily connected, in a removable manner, to the "Alpha-Beta" transfer ports, or RTP ports as above. An example of such RTP transfer ports is described by U.S. Pat. No. 5,783,156, in which a system is provided for sterilizing the door frames, as well as the closed space interposed between the doors themselves.

Furthermore, the system described by German patent application no. DE-A1-102015102143 provides that the operator handles by means of the gloves as above both the components introduced into the protected chamber by means of the transport container in order to assemble them in the intended position, for example after a sterilization cycle has been carried out, and also the components that have to be removed from the protected chamber in order to be replaced in the transport container, for example before carrying out the sterilization cycle.

One disadvantage of this solution known in the state of the art is that the gloves used, while they allow to operate inside the isolator in a manner separated from it, can constitute a mean for conveying contaminants inside the chamber. In fact, it can happen that during use holes or incisions form on the gloves through which contaminants can penetrate inside the protected chamber.

Furthermore, this solution can lead to safety problems for operators, for example in the event the gloves are damaged, and the operators come into contact with pharmaceutical products which can be dangerous, toxic and/or harmful to their health, or harmful to the surrounding environment.

Another disadvantage of this solution is that manual operations, performed with the gloves, are long and laborious since the gloves decrease the operator's tactile sensitivity.

Similar disadvantages also affect the solutions described in US patent application no. US-A1-2004/0185521, in which it is provided that the operator handles the devices for detecting bacterial loads disposed in the clean room from the outside, by using gloves associated with one of the walls of the chamber itself.

One purpose of the present invention is to provide an apparatus and a method for the automated management of a processing chamber with a controlled atmosphere which overcome at least one of the disadvantages of the solutions known in the state of the art.

One purpose of the present invention is to provide an apparatus and a method for the automated management of a processing chamber that do not require any manual intervention whatsoever by the operator through gloves.

Another purpose of the present invention is to provide an apparatus and a method for the automated management of a processing chamber which eliminate, or at least significantly reduce, possible problems of contamination of the processing chamber caused by contaminants conveyed from the outside, in particular through gloves.

Another purpose is to provide an apparatus and a method for the automated management of a processing chamber which allows to carry out assembly and disassembly operations of one or more components or elements placed inside the processing chamber in a rapid, simple and fully automatic manner.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

Embodiments described here concern an apparatus for the automated management of the assembly of a machine for processing and/or packaging products in a processing chamber. According to some embodiments, the processing chamber, or clean room, is an isolated chamber with controlled atmosphere and delimited by walls, at least one of which is provided with at least one access aperture which can be closed by means of a primary closing unit.

In some embodiments, the apparatus comprises a processing system for processing the pharmaceutical products comprising at least one modular assemblable element, which can be removably coupled to other elements to obtain the processing system, which is housed in the processing chamber.

According to embodiments described here, the apparatus comprises a transport container, for example configured as a closed tubular body, configured to be associated with the access aperture, outside the processing chamber, and provided with a secondary closing unit able to cooperate with the primary closing unit so that they can be opened to put the inside of the processing chamber in communication with the inside of the transport container, at the same time keeping them isolated and separated from the external environment. The transport container is configured to contain one or more assemblable elements, modular, which have to be coupled to other elements to obtain the processing system as above. Typically, the assemblable elements have to be temporarily positioned inside the processing chamber, or temporarily removed from the same processing chamber.

According to a characteristic aspect of the present invention, the apparatus comprises a handling device housed in the processing chamber and comprising a mobile work tool, configured to alternately grip or release the assemblable element to respectively remove it from the transport container and assemble it in a predeterminate position in order to couple it to other elements so as to obtain the processing system as above and/or de-couple it from other elements with which it forms the processing system as above and return it to the transport container.

According to one embodiment provided here, the handling device comprises a plurality of articulated components pivoted together so as to rotate each with respect to the other around respective axes of rotation, since it is configured as a robotic automatic handler, for example configured as an anthropomorphic robot with at least six work axes, which is controlled by a control unit according to determinate instructions correlated to the management of the processing chamber.

According to some embodiments, the transport container comprises a support slider provided with one or more support planes intended to receive the assemblable elements resting on them.

In accordance with embodiments provided here, the transport container comprises guide means with which suitable sliding and guide means comprised in the support slider are engaged, so as to move the support slider between a retracted position, in which the support slider is contained inside the transport container, and an extracted position, in which the support slider is at least partly extracted from the transport container and protrudes into the processing chamber.

In embodiments described here, the assemblable elements, modular, as above are elements intended to come into contact with the objects being processed, that is, with the pharmaceutical products, such as for example a hopper, or a collection container, or transport elements. Such assemblable elements are conformed so that they can be reciprocally coupled and decoupled so that they can be quickly and easily disassembled from, and reassembled on, respective equipment or devices that support them. The disassembly and subsequent reassembly are carried out by means of the handling device comprised in the management apparatus according to the present invention, which for example can be configured as an articulated robot, in particular with six work axes.

According to one aspect of the present invention, a method is provided for the automated assembly of a machine for processing and/or packaging pharmaceutical products inside a clean processing room, delimited by walls, at least one of which is provided with at least one access aperture which can be selectively closed by means of a primary closing unit.

Characteristic aspects of the method according to the present invention provide the steps of:

associating a transport container outside of the processing chamber in correspondence with the access aperture, the transport container being provided with a secondary closing unit able to cooperate with the primary closing unit so that they can be opened in order to put the inside of the processing chamber in communication with the inside of the transport container;

opening the primary and secondary closing units as above, to put the inside of the processing chamber in communication with the inside of the transport container;

removing at least one modular assemblable element from the transport container and assembling it in a predeterminate position on the system for processing the pharmaceutical products or—vice versa—removing the assemblable element from the its position inside the processing chamber in order to return it inside the transport container.

According to a characteristic aspect of the method according to the present invention, it is provided that the steps of opening, extracting and removing are carried out by means of a handling device housed in the clean room, wherein it is provided that the handling device grips the at least one modular assemblable element with a mobile work tool and provides to assemble the pharmaceutical products in a predeterminate position of the processing system.

According to embodiments of the method according to the present invention, it is provided that the step of removing the at least one assemblable element is carried out by means of a step of extracting a support slider from the transport container, in which the at least one modular assemblable element is housed, and subsequently by means of a step of extracting the at least one modular assemblable element from the support slider.

According to embodiments of the method according to the present invention, after the step of removing and assembling the at least one modular assemblable element, it is provided to reintroduce the support slider into the transport container by means of the handling device, and close the primary closing unit by means of the handling device.

In a preferred embodiment, also the step of extracting the support slider from the transport container, its subsequent reintroduction into it, and the steps of extracting the modular assemblable elements from the support slider, in addition to the subsequent step of repositioning the assemblable elements in the support slider are all carried out by the handling device.

According to another aspect of the present invention, a method is provided to prepare a machine for processing and/or packaging pharmaceutical products, wherein it is provided to manage the processing chamber in an automated manner according to the method described above for the automated management of the assembly of the processing system, and wherein inside the clean room it is provided to periodically carry out one or more sterilization cycles, using chemical substances that have bactericidal and fungicidal action, such as for example vaporized hydrogen peroxide. According to a characteristic aspect of the method to prepare such machine, the assemblable elements are disposed outside the processing chamber during the sterilization cycles, since they are taken outside and returned inside the clean room by means of the transport container as above.

Advantageously, thanks to the apparatus and the method for the automated management of the assembly of a machine for processing and/or packaging pharmaceutical products inside a processing chamber according to the present invention, it is possible to automatically assemble and disassemble the assemblable elements, modular, that make up the processing system as above, by means of the handling device preferably configured as an articulated robot.

One advantage of the present invention is that it prevents the operations of assembly and disassembly of the assemblable elements from having to be carried out manually by an operator by means of the gloves disposed on one of the walls of the processing chamber. This is advantageous because it eliminates, or significantly reduces, the risk of unwanted contaminations of the protected atmosphere of the processing chamber which can occur through the gloves, which can have slits or incisions through which germs or bacteria can enter the processing chamber.

Another advantage of the present invention is that it avoids long and laborious manual operations of assembly and disassembly of the assemblable elements for the operator, which can be inconvenient to carry out, and take a long time, thus causing long machine downtimes.

Yet another advantage of the present invention is making available a machine for processing and packaging pharmaceutical products, and a method to prepare it, which allow to introduce or extract the assemblable elements into/from the processing chamber in a completely automated manner, which determines the advantages described above.

DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

Figure 1:
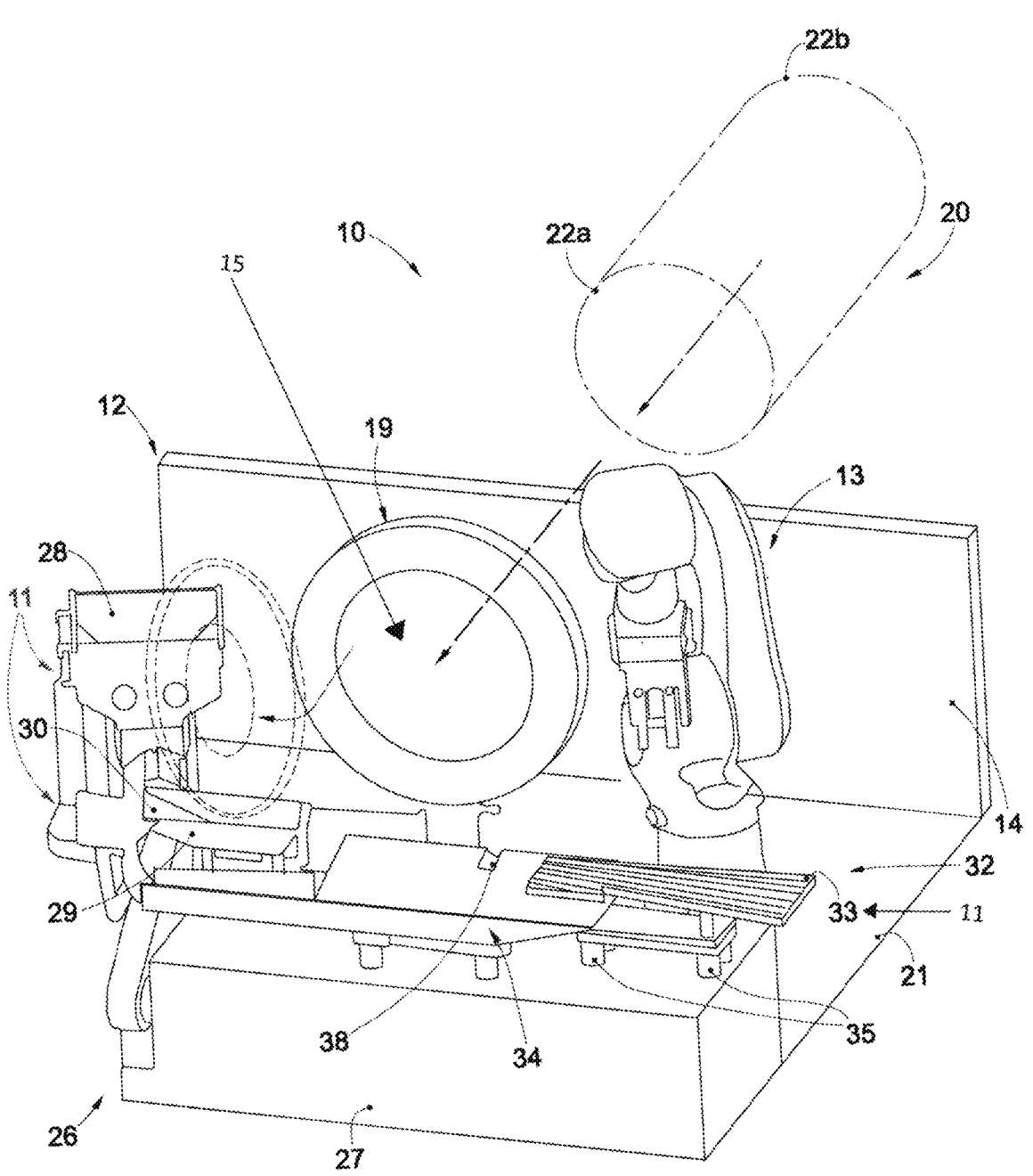
FIG. 1 is a schematic three-dimensional view of an articulated handling device comprised in the apparatus for the automated management of a processing chamber with a controlled atmosphere according to the embodiments described here.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments described using the attached drawings concern an apparatus 10 for the automated management of the assembly of a machine for processing and/or packaging pharmaceutical products inside a processing chamber 12, in the sector also called "isolator" or "clean room", of a machine for processing and/or packaging pharmaceutical products. The processing chamber 12 is a closed chamber, separate from the external environment and with a controlled atmosphere.

The apparatus 10 is suitable to be used in particular in the pharmaceutical sector to insert and position in the processing chamber 12 those assemblable elements 11 intended to come into contact with the products to be processed, and subsequently to remove such components from the processing chamber 12.

The apparatus 10 comprises at least one handling device 13 positioned inside the processing chamber 12, and a transport container 20 configured to transport one or more assemblable elements 11 inside and outside the processing chamber 12, as will be explained in more detail below.

The processing chamber 12, a portion of which can be seen in FIGS. 2-6, is separated from the external environment by walls 14 and is also provided with access apertures 15 associated with respective closing devices structured in such a way as to allow a protected transfer of material inside or outside the chamber 12.

According to some embodiments, the closing devices can be rapid transfer ports (RTP), or "Alpha-Beta" ports, of a type known in the state of the art, provided with a primary closing unit 19', also referred to as "Alpha unit", suitable to be coupled with a mating secondary closing unit 20', also referred to as a "Beta unit", provided on a transfer device, for example the transport container 20, by means of suitable reciprocal coupling interfaces.

The primary closing unit 19' can be installed on the access aperture 15 inside the processing chamber 12.

According to some embodiments, the primary closing unit 19' comprises coupling means, comprising a flange 16 which surrounds the access aperture 15, and a hatch 19a which closes the access aperture, provided with suitable sealing elements.

According to some embodiments, the hatch 19a of the primary closing unit 19' can be hinged on one side to the flange 16 so as to rotate with respect to it between a closed condition and an open condition (FIG. 1).

According to some embodiments, the primary 19' and secondary closing unit 20' can be conformed so that, once coupled to each other, the opening of the hatch 19a of the primary closing unit 19' also determines the opening of the secondary closing unit 20', so as to put the inside of the transport container 20 in communication with the inside of the processing chamber 12, maintaining the respective internal environments, now communicating with each other, separate and isolated from the external environment.

In one embodiment, the handling device 13 is configured to open and close the hatch 19a, thus determining the opening and closing of the primary 19' and secondary closing unit 20' respectively.

According to some embodiments, the mobile transport container 20 is configured to contain at least one assemblable element 11 inside it so that it can transport it in a closed and sealed condition.

With the term "assemblable element" here and hereafter in the description we mean an element comprised in equipment, devices, systems or apparatuses disposed inside the processing chamber 12 which can be used alone, or in connection with other components or objects or parts of the machine. In particular, the assemblable elements 11 in question are preferably modular elements, that is, they can be assembled and disassembled with respect to the equipment, device, system or apparatus of which they are a part. Furthermore, it should be noted the assemblable elements 11 in question are preferably components intended to come into contact with the objects to be processed in the processing chamber 12, that is, for example with the pharmaceutical products. By way of a non-limiting example, the assemblable elements 11, when coupled together, can form a system for processing the pharmaceutical products, housed inside the processing chamber 12.

According to some embodiments, the transport container 20 comprises a tubular body 22 closed at one end 22b and provided at the opposite end 22a with the secondary closing unit 20' suitable to be hermetically coupled with the primary closing unit 19' associated with the access aperture 15 provided on a wall 14 of the processing chamber 12.

According to some embodiments, the transport container 20 comprises a support slider 23 provided with one or more support planes 39 intended to receive the assemblable element 11 resting on them. In one embodiment, the slider 23 can provide at least two support planes 39, offset vertically, and that substantially have the shape of a parallelepiped.

The slider 23 is disposed sliding in the tubular body 22. In a preferred embodiment, the slider 23 is sliding on linear guides (not shown) which can have a certain inclination which allows the slider to partly protrude outside the tubular body 22 to project inside the processing chamber 12, as shown in figs. from 3 to 6. In one embodiment, the linear guides provide an end-of-travel, located in a suitable position, such as to block the advancement of the slider 23 and thus prevent its complete exit from the tubular body 22.

According to a variant embodiment, a drive unit is provided for moving the slider 23, of a type known in the state of the art and not shown, which can comprise, for example, an electric motor. In this variant, the movement of the slider 23 along the linear guides which alternately allows it to be extracted from the tubular body 22 (so as to be extracted at least in part outside the latter), and subsequently to be reintroduced inside it, is obtained by means of the drive unit as above.

In another alternative embodiment, the slider 23 is moved by the handling device 13, which extracts it from the tubular body 22 and reintroduces it therein. In this embodiment, the slider 23 can comprise suitable gripping means, for example conformed as a hook, a peg or a bracket, and intended to be grip by the handling device 13 during the extraction and the reintroduction of the slider 23.

According to some embodiments described here, the handling device is configured as an articulated robot 13, of a type known in the state of the art.

The articulated robot 13 comprises a plurality of articulated components 17 pivoted one to the other and is in particular suitable to be used in the sector of production and packaging of pharmaceutical products. That is to say, the articulated robot 10 can be used in isolated chambers which have to meet stringent sterility requirements to prevent possible contamination of the pharmaceutical products themselves, such as for example the processing chamber 12 of a so-called isolator.

To this end, the articulated robot 13 in question is suitable, in particular, to be subjected to appropriate decontamination and sterilization treatments, for example CIP and/or SIP treatments which provide the use Vapor Phase Hydrogen Peroxide (VPHP), which has a high oxidizing power with a bactericidal, sporicidal and fungicidal action, without oxidation of its external surface, or possible damage to the components themselves.

Figures 1A, 2:
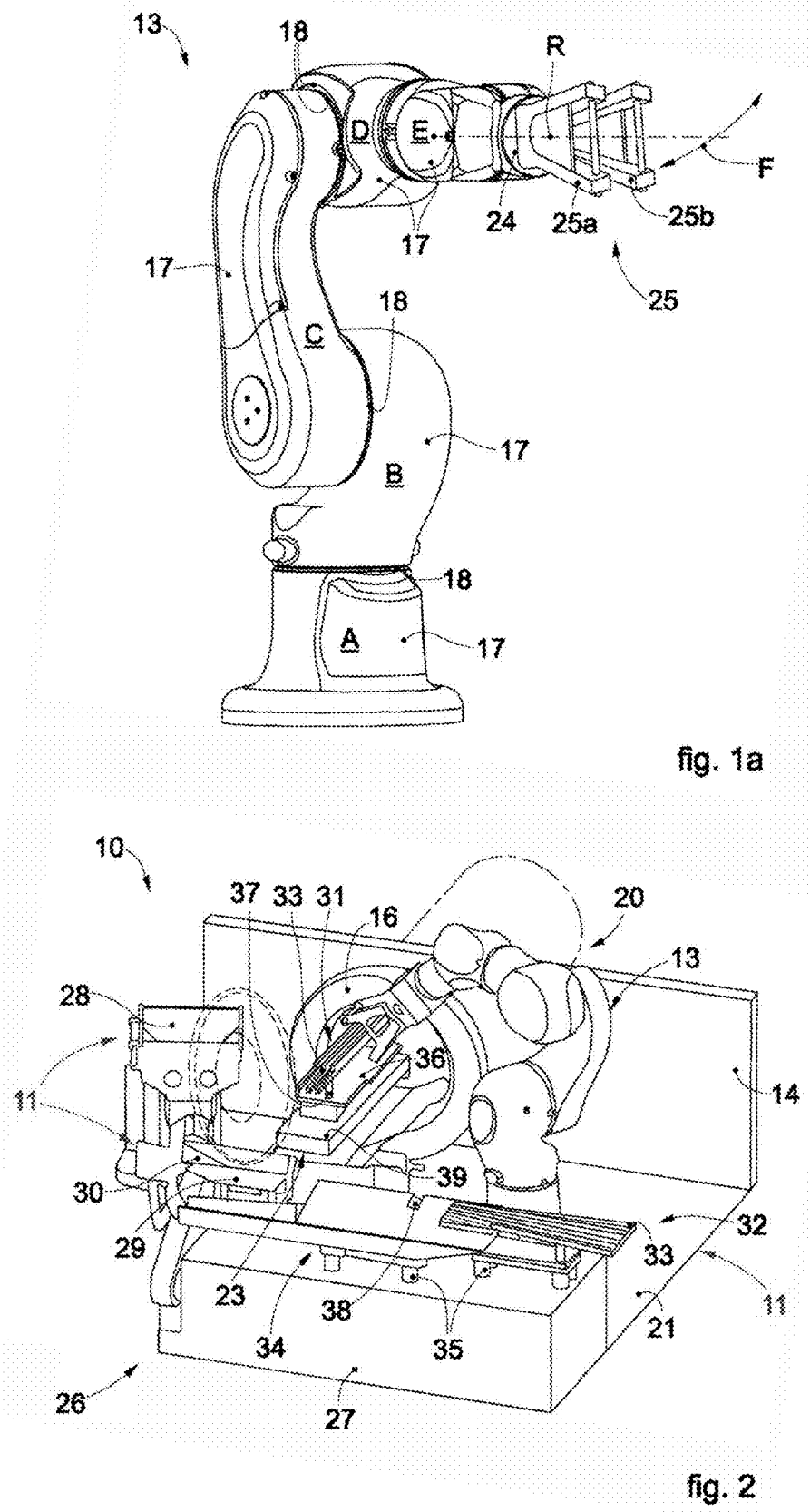
FIGS. 2 to 6 are schematic three-dimensional views that show an operating sequence of the apparatus for the automated management of a processing chamber with a controlled atmosphere in accordance with the present invention.

By way of example, the articulated robot 13, shown enlarged in FIG. 1*a,* has five articulated components 17, respectively indicated by the letters A, B, C, D, E, coupled in an articulated manner one after the other in correspondence with respective coupling interfaces 18.

According to some embodiments, in correspondence with the coupling interfaces 18, movement members, not shown, can be provided, configured to allow a relative rotation of the two respectively coupled articulated components 17 around a common axis of rotation.

It is not excluded, however, that the articulated robot 13 can have a smaller or greater number of articulated components 17, depending on requirements.

According to some embodiments, each articulated component 17 is at least partly hollow and is internally provided with a housing compartment (not shown) configured to house the drive members, the electrical and electronic circuitry and/or the ducts for fluids required to move the articulated component 17 itself and to transmit power and data signals between the respective articulated components 17.

In one embodiment, the succession of articulated components 17 comprises a base articulated component, indicated with the letter A in FIG. 1*a,* intended to be attached to a floor 21 of the processing chamber 12, an end articulated component, indicated with the letter E in FIG. 1*a,* and a plurality of other articulated components interposed between them to define the kinematic chain that governs the movement of the handling device 13, indicated with the letters B, C and D in FIG. 1*a.* The end articulated component E comprises an attachment portion 24 to which a work tool 25 is connected in a temporary and removable manner.

In the embodiment shown in FIG. 1*a,* the work tool 25 is conformed as a gripper comprising a first and a second gripping element 25*a,* 25*b* cooperating with each other to remove and release the assemblable element 11.

The first and second gripping elements 25*a,* 25*b* are mobile with respect to each other to move reciprocally toward/away from each other, as indicated by the arrow F in FIG. 1, in order to respectively grip and release the assemblable element 11, and they can also rotate around the axis of rotation R.

Thanks to the fact that the work tool 25 is supported at the end of an articulated robot 13 formed by a plurality of articulated components 17 (five in the example described and shown in the attached drawings), it is able to be moved in space at will, since it is able to reach a sufficiently wide maneuvering space.

It is evident that according to alternative embodiments, all included within the field of protection of the present invention, the work tool 25 can be conformed differently from what is shown by way of example in FIG. 1*a,* but in many ways technically equivalent to it.

In one embodiment, the apparatus 10 can comprise two or more handling devices 13, each for example being able to be configured as an articulated robot such as the one described above with reference to FIG. 1*a* and being placed in a suitable respective position inside the processing chamber 12.

Inside the processing chamber 12, there are provided a plurality of pieces of equipment, devices, systems or apparatuses configured to carry out respective processes on the pharmaceutical products.

By way of example, we refer to a processing system 26 of pharmaceutical products configured as a transport system for transporting the pharmaceutical products inside the processing chamber 12. One portion of this processing system 26 can be seen in FIGS. 2-6, for the sole purpose of better clarifying the subsequent description of the functioning of the apparatus according to the present invention. Hereafter in the description, with reference number 26 we will refer specifically to the transport system, described purely by way of example with reference to the embodiments shown in FIGS. 2-6.

It is clear that the person of skill in the art will understand that the transport system 26, which is not comprised in the apparatus 10 according to the present invention, can be made according to many other embodiments, all equivalent to the one described below with reference to FIGS. 2-6.

The transport system 26 can comprise a base 27 attached to the floor 21 of the processing chamber 12.

According to some embodiments, the transport system 26 can be of the vibrating type. In this case, the transport system 26 can comprise one or more vibrator devices (not shown) suitable to properly make one or more elements of the transport system 26 vibrate, according to determinate frequencies, so as to determine the feed of the objects being transported. In some embodiment versions, such vibrator devices can be disposed inside the base 27, or in any case associated with, and supported by, the latter.

The transport system 26 comprises a hopper 28 intended to receive a multitude of objects haphazardly, such objects possibly being pharmaceutical products such as for example pills, tablets or capsules. The transport system 26 also comprises a collection container 29, into which the objects leaving the hopper 28 arrive. In one embodiment, the collection container 29 is disposed below the hopper 28, in communication with an exit thereof, so that the objects contained in the hopper 28 can gradually fall by gravity into the collection container 29. According to a version provided here, the collection container 29 has an inclined bottom 30 so as to allow the objects to advance by sliding.

The transport system 26 comprises a first transport element 31 and a second transport element 32 on which a plurality of tracks 33 are made, inside which the objects as above are fed. In one embodiment, the transport elements 31, 32 are adjacent to each other so that the tracks 33 made in one are the direct continuation of the ones made in the other.

The transport system 26 comprises a support bench 34 intended to receive the transport elements 31, 32 resting on it, in a stable and removable manner. The support bench 34 is supported by spacer elements 35, for example configured as columns, to distance it from the base 27.

According to some embodiments provided here, the transport elements 31, 32 are supported by the support bench 34 by means of a mechanical coupling, for example by means of a same-shape coupling which can provide both a connection with play, and also with interference.

In the version shown by way of example in the drawings, the transport elements 31, 32 comprise the plane on which the objects advance, in which the tracks 33 are made, and a base plane 36 which supports the advance plane, that is, the tracks 33, by means of support columns 37. In this version, the support bench 34 comprises one or more seatings 38, in particular made as hollows on a lateral wall of the support bench 34, for example on the wall facing the handling device 13. In some embodiments, the seatings 38 are shaped as holes with a substantially cylindrical shape, sized so as to each house a respective support column 37. In other words, since the seatings 38 are intended to each receive a support column 37, the sizes and shape of the seatings 38 are correlated to those of the support columns 37.

It should be noted that the first transport element 31 and the second transport element 32 constitute only some non-limiting example embodiments of the assemblable elements 11. Other examples of assemblable components 11, modular, are, with reference to the embodiment that can be seen in FIGS. 1-6, the hopper 28 and the collection container 29.

According to some embodiments, the automated management apparatus 10 comprises a control and command unit 40 (FIG. 1) configured to control and command the functioning of the automated management apparatus 10, in particular to control and command the handling device or articulated robot 13.

In accordance with embodiments provided here, the apparatus 10 comprises a recognition device which is configured to recognize the assemblable element 11 and send a corresponding recognition signal to the handling device 13, in particular through the control and command unit 40. In possible embodiments, the recognition device comprises at least one sensor configured to acquire images to recognize the assemblable element 11. In the example shown in FIG. 1, the recognition device is configured as a video camera, in particular of the high-resolution type commonly used in industrial automation applications, indicated with reference number 41. The video camera 41 can for example be attached to one of the walls 14 of the chamber 12, in a suitable position that allows it to have a field of vision over the entire processing system 26.

According to possible embodiments, the recognition signal as above contains information relating to at least one of either the assembly position and/or assembly direction of the assemblable element 11, modular, on the processing system 26, and/or the gripping position of the assemblable element 11, modular, by the handling device 13.

In some embodiments, it is provided that the assemblable element 11 comprises an identification code for its recognition by the recognition device, of a known type and not shown. By way of a non-limiting example, such identification code can be configured as an RFID tag, a barcode, or any other alphanumeric code whatsoever.

With reference to the drawings, the functioning of the apparatus for the automated management of the processing chamber 12 is now described.

Initially, it is provided to attach the secondary closing unit 20' made on a transport container 20 to a primary closing unit 19' of the processing chamber 12 (FIG. 2). The transport container 20 contains inside it an assemblable element 11 positioned resting on the support slider 23. It should be noted that the disposition of the assemblable element 11 on the support slider 23 can be previously carried out by an operator, for example in an environment with a controlled atmosphere.

The transport container 20 is positioned in a closed condition, so that its secondary closing unit 20' couples to the primary closing unit 19'. Subsequently, it is provided to open the hatch 19a toward the inside of the processing chamber 12, so as to open both the primary and secondary closing unit 19', 20' and put the inside of the transport container 20 in communication with the inside of the processing chamber 12, as shown in FIG. 2.

At this point the slider 23 is extracted in the manner described above, so that the handling device 13 can remove the assemblable element 11.

It should be noted that, in the embodiments in which the apparatus provides the recognition device 41, before the steps that will be described below, there is provided a step of recognition of the assemblable element 11, modular, by the recognition device 41. Such step provides to send a corresponding recognition signal to the handling device 13, in particular by means of the control and command unit 40. According to some embodiments of the method according to the present invention, the recognition signal as above contains information relating to the position and/or direction of assembly of the modular assemblable element 11 on the processing system 26, and/or to the gripping position of the modular assemblable element 11 by the handling device 13.

Figure 3:
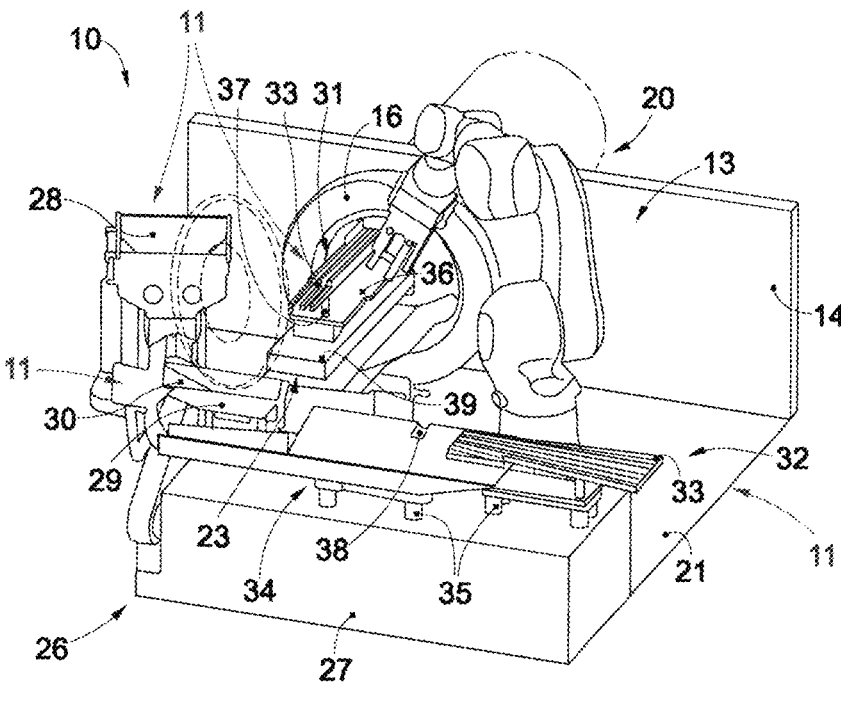
Figure 4:
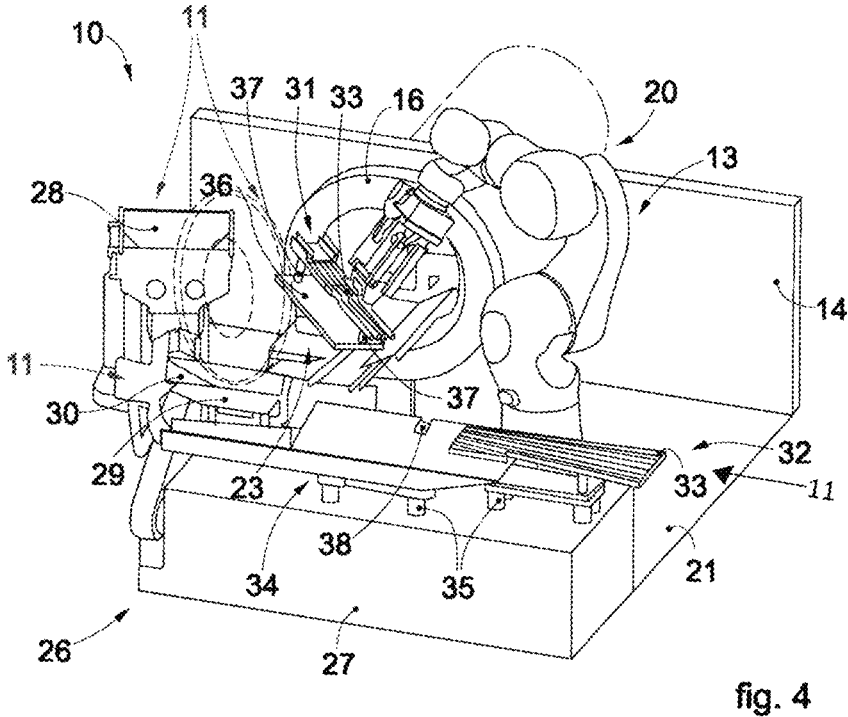

For this purpose, the handling device 13 is disposed so as to take the work tool 25 in the proximity of the assemblable element 11, and the gripping elements 25, 25b are brought close to each other so as to grasp the assemblable element 11 (FIGS. 3 and 4).

Figure 5:
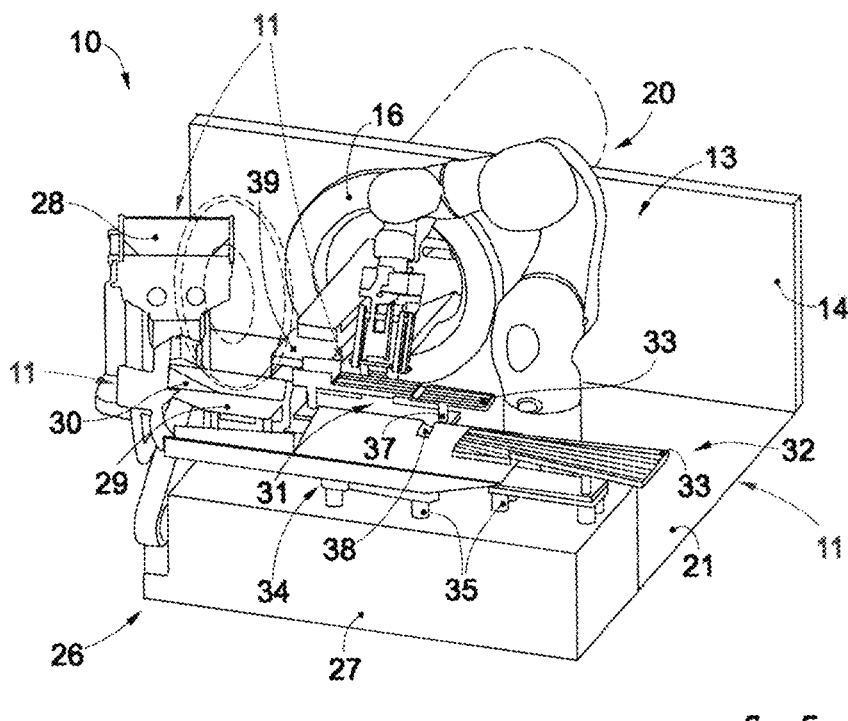
Figure 6:
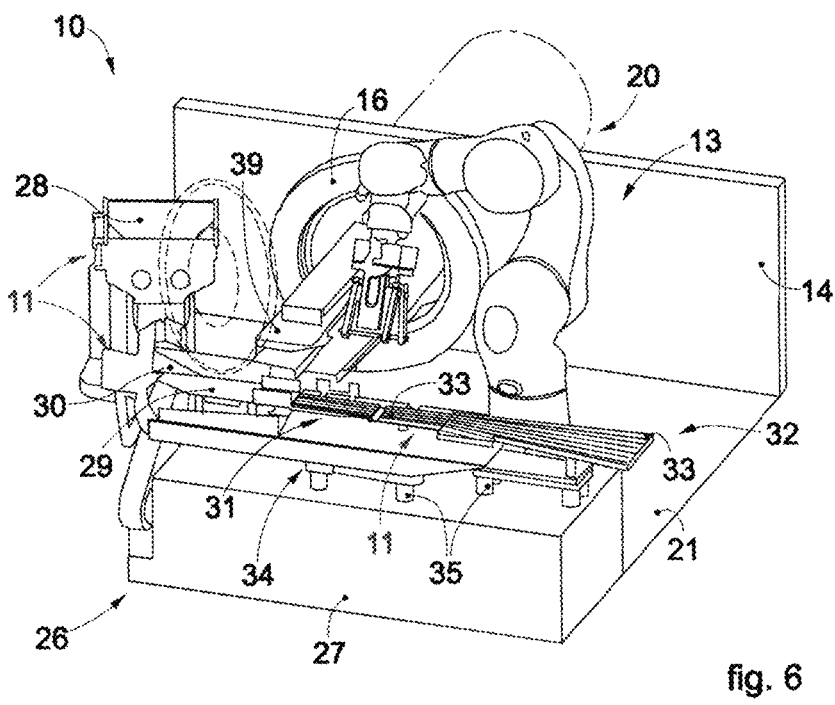

Subsequently, the handling device 13 is disposed so as to place the assemblable element 11 in the expected position, which—in the example shown—is on the support bench 34. In the particular embodiment described above, the handling device 13 disposes the assemblable element 11 on the support bench 34 causing the support columns 37 to be inserted into the respective seatings 38 (FIGS. 5 and 6).

Subsequently, the gripping elements 25a, 25b are moved away from each other and the handling device 13 can thus release the assemblable element 11.

When it is necessary to disassemble the assemblable element 11, the handling device 13 can of course be commanded to carry out the sequence described above with reference to FIGS. 1-6 in a reverse order, so as to remove the assemblable element 11 from its operating position (for example from the support bench 34) and rest it on the support slider 23 so that it is closed within the transport container 20.

It should be noted that the functioning of the automated management apparatus 10 has been described with reference to the example in which the handling device 13 removes the first transport element 31 from the transport container 20 to deposit it on the support bench 34. It is evident that the functioning of the apparatus 10 would be the same also in those cases in which the articulated robot 13 handles assemblable elements 11 different from the first transport element 31, such as for example the second transport element 32, the hopper 28 or the collection container 29.

It is clear that modifications and/or additions of parts or steps may be made to the apparatus 10 and method for the automated management of a processing chamber 12 as described heretofore, without departing from the field and scope of the present invention.

It is also clear that, although the present invention has been described with reference to some specific examples, a person of skill in the art shall certainly be able to achieve many other equivalent forms of apparatus 10 and method for the automated management of a processing chamber 12, having the characteristics as set forth in the claims and hence all coming within the field of protection defined thereby.

The invention claimed is:

1. An apparatus for the automated management of the assembly of a machine for processing and/or packaging pharmaceutical products inside a chamber, comprising:

said chamber delimited by walls, at least one of said walls being provided with at least one access aperture which can be selectively closed by means of a primary closing unit;

a processing system for processing the pharmaceutical products comprising at least one modular assemblable element, which can be removably coupled to other modular assemblable elements to obtain said processing system, said processing system being housed in said chamber;

a transport container configured to be associated with said at least one access aperture from the outside of said chamber and provided with a secondary closing unit able to cooperate with the primary closing unit of said chamber so that they can be opened in order to put the inside of said transport container in communication with the inside of said chamber, said transport container being configured to contain said at least one modular assemblable element that has to be coupled inside said chamber to said other modular assemblable elements to obtain said processing system; and an automated handling device housed in said chamber and comprising a work tool configured to:

grip said at least one modular assemblable element for removing said at least one modular assemblable element from said transport container and for releasing said at least one modular assemblable element for assembly in a predeterminate position to couple the removed at least one modular assemblable element to said other modular assemblable elements so as to obtain said processing system and/or grip said at least one modular assemblable element to de-couple said at least one modular assemblable element from the predeterminate position in which it was assembled to said other modular assemblable elements with which it forms said processing system and return said at least one modular assemblable element into said transport container.

2. The apparatus as in claim 1, further comprising a recognition device configured to recognize said at least one modular assemblable element and send a corresponding recognition signal to said automated handling device.

3. The apparatus as in claim 2, wherein said recognition signal contains information relating to at least one of either the assembly position and/or the direction of assembly of said at least one modular assemblable element on said processing system, or a gripping position of said at least one modular assemblable element by said automated handling device.

4. The apparatus as in claim 2, wherein said recognition device comprises at least one sensor configured to acquire images for recognizing said at least one modular assemblable element.

5. The apparatus as in claim 2, wherein said at least one modular assemblable element comprises an identification code for its recognition by said recognition device.

6. The apparatus as in claim 1, wherein said work tool comprises a gripper formed by a first gripping element and a second gripping element; wherein said first gripping element and second gripping element are configured to cooperate with each other to respectively grip and release said at least one modular assemblable element.

7. The apparatus as in claim 1, wherein said automated handling device comprises a robotic automatic handler configured as an anthropomorphic robot with at least six work axes, which is controlled by a control and command unit.

8. The apparatus as in claim 1, wherein said processing system is configured as a transport system to transport the pharmaceutical products inside said chamber.

9. The apparatus as in claim 8, wherein said at least one modular assemblable element is formed by a transport element on which the pharmaceutical products advance to obtain said transport system.

10. The apparatus as in claim 1, wherein said at least one modular assemblable element comprise a hopper and/or a collection container which can be associated with said processing system.

11. A method for the automated assembly of a machine for processing and/or packaging pharmaceutical products inside a chamber, delimited by walls, at least one of said walls being provided with at least one access aperture which can be selectively closed by a primary closing unit, said method comprising the steps of:

providing a processing system housed in said chamber for processing the pharmaceutical products, wherein the processing system comprises at least one modular assemblable element, which can be removably coupled to other modular assemblable elements to obtain said processing system;

associating a transport container outside of said chamber, in correspondence with said at least one access aperture, said transport container being provided with a secondary closing unit able to cooperate with said primary closing unit so that they can be opened in order to put the inside of said transport container in communication with the inside of said chamber, wherein said transport container is configured to contain one or more of said modular assemblable elements, which have to be coupled to said other modular assemblable elements to obtain the processing system;

opening said primary and secondary closing unit, to put the inside of said chamber in communication with the inside of said transport container; and removing at least one of said modular assemblable elements contained in said transport container and assembling said removed at least one modular assemblable element in a predeterminate position on said processing system for processing pharmaceutical products, or removing said at least one modular assemblable element from the predeterminate position to return said at least one modular assemblable element into said transport container; wherein said steps of opening and removing are carried out by means of an automatic handling device housed in said chamber, wherein said automated handling device grips said at least one modular assemblable element with a work tool in order to remove said at least one modular assemblable element from said transport container and assemble the processing system for processing pharmaceutical products in the predeterminate position of the processing system or to remove said at least one modular assemblable element from the predetermined position in which it was assembled to said other modular assemblable elements with which it forms said processing system and return said at least one modular assemblable element into said transport container.

12. The method as in claim 11, further comprising a step of recognizing said at least one modular assemblable element by a recognition device in which a corresponding recognition signal is sent to said automated handling device.

13. The method as in claim 12, wherein said recognition signal contains information relating to the position and/or direction of assembly of said at least one modular assemblable element on said processing system, and/or to a gripping position of said at least one modular assemblable element by said handling device.

14. The method as in claim 11, wherein the step of removing said at least one modular assemblable element is carried out by means of a step of extracting a support slider from said transport container, said at least one modular assemblable element being housed in said support slider, and subsequently by means of a step of extracting said at least one modular assemblable element from said support slider.

15. The method as in claim 14, wherein after said step of removing and assembling said at least one modular assemblable element is provided to reintroduce said support slider into said transport container by means of said automated handling device, and close said primary closing unit by means of said automated handling device.

16. An apparatus for the automated management of the assembly of a machine for processing and/or packaging pharmaceutical products inside a chamber, comprising:

said chamber delimited by walls, at least one of said walls being provided with at least one access aperture which can be selectively closed by means of a primary closing unit;

a processing system for processing the pharmaceutical products comprising at least one modular assemblable element, which can be removably coupled to other modular assemblable elements to obtain said processing system, said processing system being housed in said chamber;

a transport container configured to be associated with said at least one access aperture from the outside of said chamber and provided with a secondary closing unit able to cooperate with the primary closing unit of said chamber so that they can be opened in order to put the inside of said transport container in communication with the inside of said chamber, said transport container being configured to contain said at least one modular assemblable element that has to be coupled inside said chamber to said other modular assemblable elements to obtain said processing system, a handling device housed in said chamber and comprising a work tool configured to:

grip said modular assemblable element for removing the at least one modular assemblable element from said transport container and for releasing said at least one modular assemblable element in order to assemble said at least one modular assemblable element in a predeterminate position in order to couple said removed at least one modular assemblable element to said other modular assemblable elements so as to obtain said processing system and/or grip said at least one modular assemblable element to de-couple said at least one modular assemblable element from the predeterminate position in which it was assembled to said other modular assemblable elements with which it forms said processing system and return said at least one modular assemblable element into said transport container; and a recognition device configured to recognize said at least one modular assemblable element and send a corresponding recognition signal to said handling device.

17. An apparatus for the automated management of the assembly of a machine for processing and/or packaging pharmaceutical products inside a chamber, comprising:

said chamber delimited by walls, at least one of said walls being provided with at least one access aperture which can be selectively closed by means of a primary closing unit;

a processing system for processing the pharmaceutical products comprising at least one modular assemblable element, which can be removably coupled to other modular assemblable elements to obtain said processing system, said processing system being housed in said chamber;

a transport container configured to be associated with said at least one access aperture from the outside of said chamber and provided with a secondary closing unit able to cooperate with the primary closing unit of said chamber so that they can be opened in order to put the inside of said transport container in communication with the inside of said chamber, said transport container being configured to contain said at least one modular assemblable element that has to be coupled inside said chamber to said other modular assemblable elements to obtain said processing system, a handling device housed in said chamber and comprising a work tool configured to:

grip said modular assemblable element for removing the at least one modular assemblable element from said transport container and for releasing said at least one modular assemblable element in order to assemble said at least one modular assemblable element in a predeterminate position in order to couple said removed at least one modular assemblable element to said other modular assemblable elements so as to obtain said processing system and/or grip said at least one modular assemblable element to de-couple said at least one modular assemblable element from the predeterminate position in which it was assembled to said other modular assemblable elements with which it forms said processing system and return said at least one modular assemblable element into said transport container; and wherein said handling device comprises a robotic automatic handler configured as an anthropomorphic robot with at least six work axes, which is controlled by a control and command unit.

18. A method for the automated assembly of a machine for processing and/or packaging pharmaceutical products inside a chamber, delimited by walls, at least one of said walls being provided with at least one access aperture which can be selectively closed by a primary closing unit, said method comprising the steps of:

providing a processing system housed in said chamber for processing the pharmaceutical products, wherein the processing system comprises at least one modular assemblable element, which can be removably coupled to other modular assemblable elements to obtain said processing system;

associating a transport container outside of said chamber, in correspondence with said at least one access aperture, said transport container being provided with a secondary closing unit able to cooperate with said primary closing unit so that they can be opened in order to put the inside of said transport container in communication with the inside of said chamber, wherein said transport container is configured to contain one or more of said at least one modular assemblable elements, which have to be coupled to said other modular assemblable elements to obtain the processing system;

opening said primary and secondary closing unit, to put the inside of said chamber in communication with the inside of said transport container; and removing said at least one modular assemblable element contained in said transport container and assembling the removed at least one modular assemblable element in a predeterminate position on said processing system for processing pharmaceutical products, or removing said at least one modular assemblable element from the predeterminate position to return said at least one modular assemblable element into said transport container;

wherein said steps of opening and removing are carried out by means of a handling device housed in said chamber, wherein said handling device grips said at least one modular assemblable element with a work tool in order to remove said at least one modular assemblable element from said transport container and to assemble the processing system for processing pharmaceutical products in the predeterminate position of the processing system or to remove said at least one modular assemblable element from the predetermined position in which was assembled to the other modular assemblable elements with which it forms said processing system and return said at least one modular assemblable element into said transport container; wherein the method also comprises a step of recognizing said at least one modular assemblable element by a recognition device in which a corresponding recognition signal is sent to said handling device.

\* \* \* \* \*